United States Patent
Kawabe et al.

[19]

[11] Patent Number: 6,062,580
[45] Date of Patent: May 16, 2000

[54] FRONT SUSPENSION OF MOTOR VEHICLE

[75] Inventors: Yoshihiro Kawabe; Takuya Murakami; Kenji Kawagoe; Tamiyoshi Kasahara, all of Kanagawa, Japan

[73] Assignee: Nissan Motor Co., Ltd., Yokohama, Japan

[21] Appl. No.: 09/095,589

[22] Filed: Jun. 11, 1998

[30] Foreign Application Priority Data

Jun. 12, 1997 [JP] Japan .................................... 9-155473

[51] Int. Cl.[7] ....................................................... B60A 3/20
[52] U.S. Cl. ......................... 280/124.145; 280/124.135; 280/124.154
[58] Field of Search .................................. 280/134, 135, 280/138, 145, 154

[56] References Cited

U.S. PATENT DOCUMENTS

| | | | |
|---|---|---|---|
| 4,377,298 | 3/1983 | Fiinn et al. | 280/124.145 |
| 4,871,187 | 10/1989 | Schaible | 280/124.145 |
| 5,372,377 | 12/1994 | Lee | 280/124.145 |
| 5,498,020 | 3/1996 | Lee | 280/124.145 |
| 5,873,587 | 2/1999 | Kawabe et al. | 280/124.145 |

FOREIGN PATENT DOCUMENTS

| | | |
|---|---|---|
| 0 253 384 | 1/1988 | European Pat. Off. . |
| 196 39 002 | 3/1997 | Germany . |
| 5-178041 | 7/1993 | Japan . |

OTHER PUBLICATIONS

*Patent Abstracts of Japan*, vol. 16, No. 510, (M–1328), Oct. 21, 1992, abstract of Tanaka Atsuo, "Double Link Type Suspension Device," Japanese App. No. 4–189612, Jul. 8, 1992.

*Patent Abstracts of Japan*, vol. 17, No. 598, (M–1504), Nov. 2, 1993, abstract of Ando Fumitaka, "Suspension Device of Vehicle," Japanese App. No. 5–178041, Jul. 20, 1993.

*Patent Abstracts of Japan*, vol. 17, No. 576, (M–1499), Oct. 20, 1993, abstract of Ando Fumitaka, "Suspension Device of Vehicle," Japanese App. No. 5–169938, Jul. 9, 1993.

*Primary Examiner*—Kenneth R. Rice
*Attorney, Agent, or Firm*—Foley & Lardner

[57] ABSTRACT

A steering knuckle has an upper portion and a lower portion. A lower link has an outer end pivotally supporting the lower portion of the steering knuckle and an inner end swingably supported by a vehicle body. A connecting member is mounted to the upper portion of the knuckle and rotatable about a first axis relative to the upper portion. A shock absorber has an upper end pivotally connected to the vehicle body at a first point and a lower portion connected to the connecting member. An upper link is pivotally connected to the connecting member at a second point and pivotally connected to the vehicle body at a third point. A tie rod is connected to the supporting member to rotate the same about the first axis. The first axis intersects a second axis passing through the second and third points and passes through a limited area containing the first point.

7 Claims, 9 Drawing Sheets

FRONT

FRONT SUSPENSION OF MOTOR VEHICLE

The contents of Japanese Patent Application 9-155473 filed Jun. 12, 1997 are hereby incorporated by reference.

BACKGROUND OF THE INVENTION

1. Field of the Invention

The present invention relates in general to suspensions of wheels of motor vehicles, and more particularly to front suspensions for front wheels of the motor vehicles.

2. Description of the Prior Art

For clarifying the invention, one conventional front suspension shown in Japanese First Provisional Publication 5-178041 will be briefly described.

In this conventional front suspension, a lower end of a steering knuckle is connected through two lower links to the vehicle body in such a manner that the steering knuckle can swing up and down. A connecting member is pivotally connected to an upper end of the steering knuckle. The connecting member is connected to a lower end of a shock absorber so that the connecting member can swing up and down together with the steering knuckle. One end of an upper link is pivotally connected to the vehicle body. The other end of the upper link is branched into two portions which are pivotally connected to the connecting member, so that the upper link can swing up and down. The connecting member is so arranged that an axis thereof is positioned inside an imaginary king pin axis. With this arrangement, the front suspension possesses both an advantage of a strut type suspension and that of a double wishbone type suspension.

As is described hereinabove, in the conventional front suspension, the upper link is connected to the connecting member at two points. Furthermore, the upper link is so arranged as to pivot about an axis substantially parallel with a longitudinal axis of the vehicle.

However, even this arrangement has caused the front suspension from providing users with satisfaction due to the following reasons.

Due to the two point connection between the upper link and the connecting member, two resilient bushes or joints are inevitably needed, which causes increase in weight of the suspension. For the pivotal movement of the upper link about the axis, special and thus expensive bush or joint is needed. Furthermore, due to the two joints (or bushes) which are spaced in a longitudinal direction of the vehicle, the suspension has an increased dimension in that direction, which increases a possibility of interference with a tire particularly when steered.

SUMMARY OF THE INVENTION

It is therefore an object of the present invention to provide a front suspension of a motor vehicle which is free of the above-mentioned drawbacks.

It is an object of the present invention to provide a front suspension of a motor vehicle by which the camber rigidity and the lateral rigidity are appropriately balanced.

It is another object of the present invention to provide a front suspension of a motor vehicle in which layout of essential parts, such as upper and lower links, shock absorber, etc., is easily achieved.

According to the present invention, there is provided a wheel suspension for a front wheel of a motor vehicle. The wheel suspension has a supporting member rotatably supporting the front wheel. The supporting member has an upper portion and a lower portion. A lower link has an outer end pivotally supporting the lower portion and an inner end swingably supported by a vehicle body. A connecting member is mounted to the upper portion and rotatable about a first axis relative to the upper portion. A shock absorber has an upper end pivotally connected to the vehicle body at a first point and a lower portion connected to the connecting member. An upper link is pivotally connected to the connecting member at a second point and pivotally connected to the vehicle body at a third point. A tie rod is connected to the supporting member to rotate the same about the first axis. The first axis intersects a second axis passing through the second and third points and passes through a limited area containing the first point.

DETAILED DESCRIPTION OF THE EMBODIMENTS

In the following, embodiments of the present invention will be described. Throughout the specification, the terms "front", "rear", "left", "right", "inside", "outside", "longitudinal", "lateral" and the like are to be understood with respect to a motor vehicle to which the present invention is practically applied.

Figure 1:
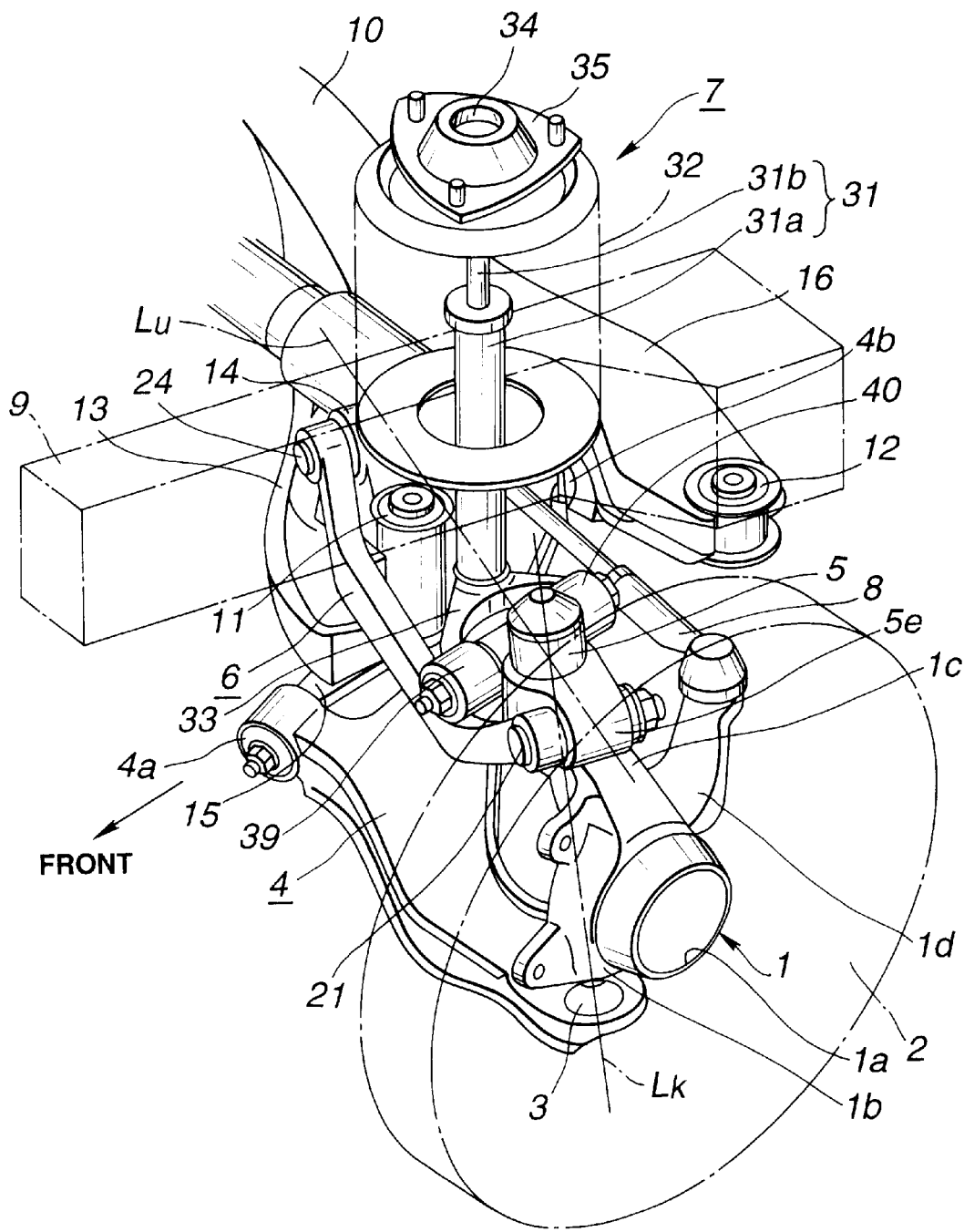
FIG. 1 is a perspective view of a front suspension which is a first embodiment of the present invention.

Referring to FIG. 1, there is shown a front suspension which is a first embodiment of the present invention.

In the drawing, denoted by numeral 1 is a steering knuckle (or wheel supporting member) which rotatably supports a front wheel 2. The steering knuckle 1 has at a center portion thereof a cylindrical bore 1a through which an axle of the front wheel 2 passes. To a lower end 1b of the steering knuckle 1, there is connected a lower link 4 through a ball-joint 3. To an upper end 1c of the steering knuckle 1, there are connected through a rotary connecting member 5 both an upper link 6 and a strut 7. To a supporting portion 1d which projects rearward from a center portion of the knuckle 1, there is connected a tie rod 8 which is connected to a steering device (not shown).

A side member 9 extends in a longitudinal direction inside the steering knuckle 1. To a lower surface of the side member 9, there is connected through resilient bushes 11 and 12 a suspension member 10 which extends in the lateral direction of the vehicle.

The outer end of the suspension member 10 is branched into two portions 13 and 16. As is understood from FIGS. 2 and 1, one branched portion 13 is raised upward and has the resilient bush 11 connected thereto. The branched portion 13 has at an inside position of the resilient bush 11 a supporting portion 14 which supports the upper link 6. The branched portion 13 has further at an inside position of the supporting portion 14 and below the same another supporting portion 15 which supports the lower link 4. As is seen from FIG. 1, the other branched portion 16 has at a leading end the resilient bush 12 connected thereto.

Figure 2:
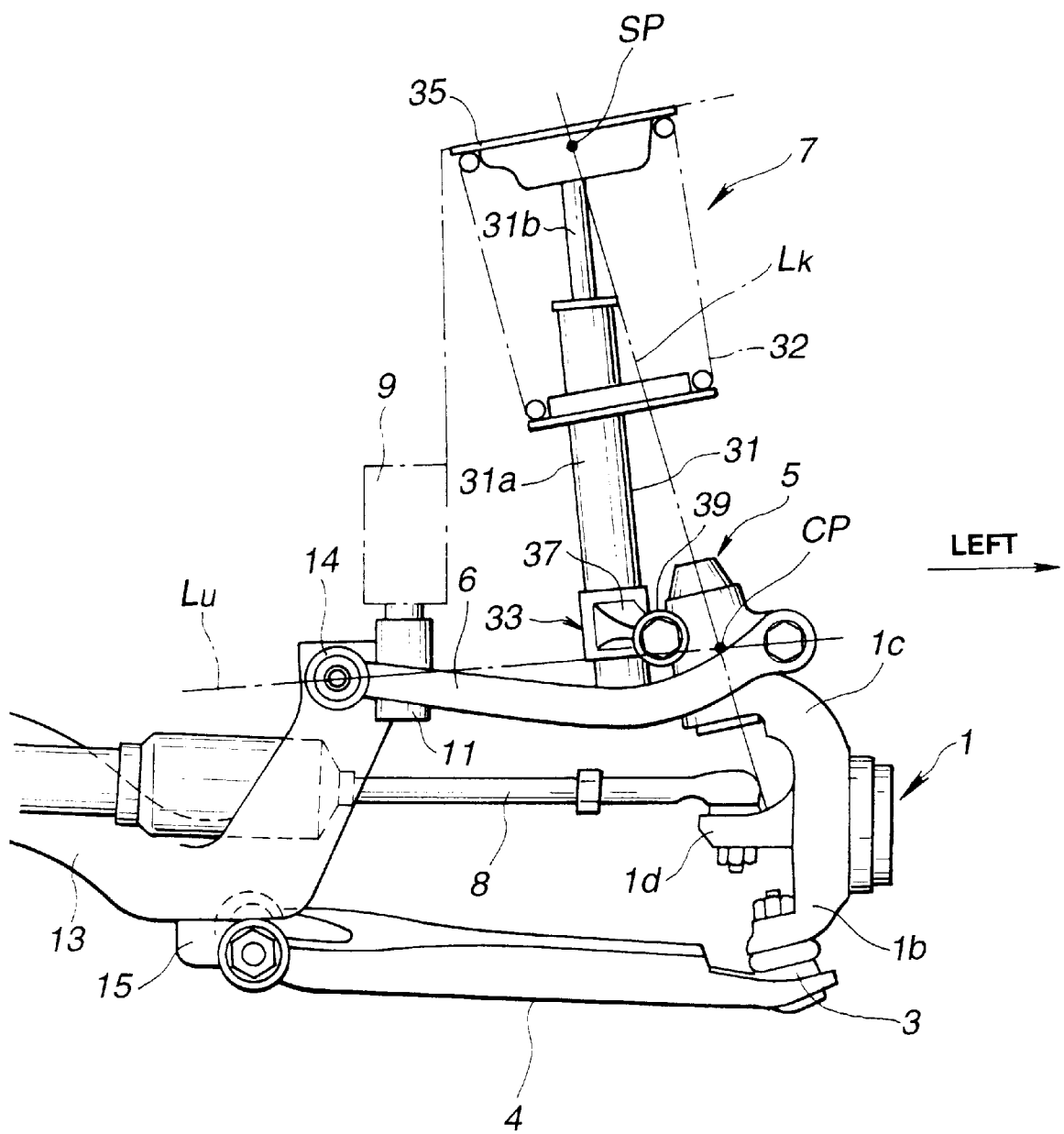
FIG. 2 is a front view of the front suspension, which is taken from a front position of an associated motor vehicle.

As is best seen from FIG. 2, the lower link 4 extends in a lateral direction of the vehicle. An outside end of the lower link 4 is connected through a ball-joint 3 to the lower end 1b of the steering knuckle 1. While, an inside portion of the lower link 4 is branched into two portions which are connected through respective resilient bushes 4a and 4b to spaced portions of the supporting portion 15. The lower link 4 is shaped like character "A" when viewed from above. The lower link 4 thus allows a vertical movement or bound/rebound of the steering knuckle 1, but retains a longitudinal movement of the same.

Figure 3:
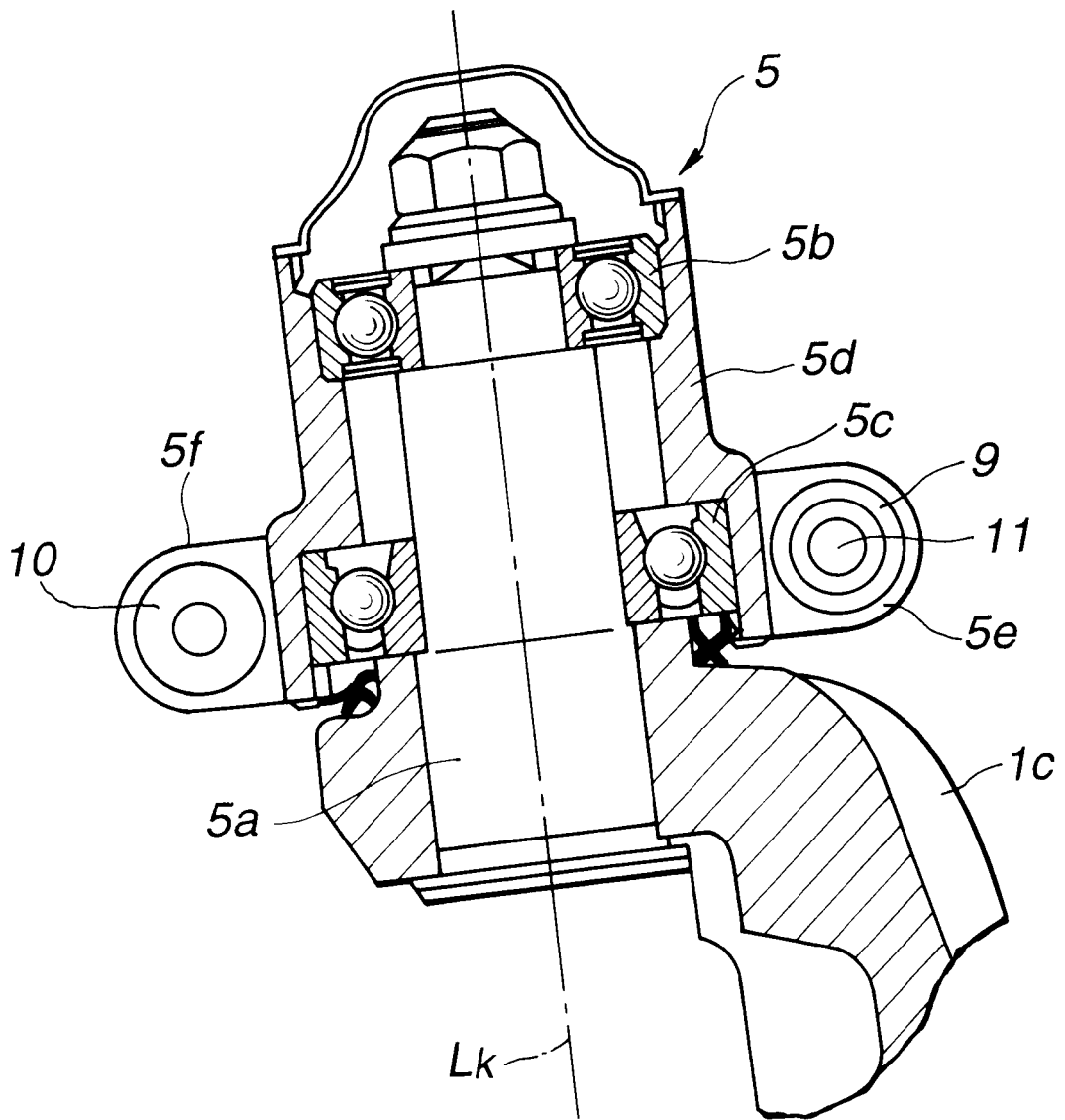
FIG. 3 is a sectional view of a rotary connecting member employed in the front suspension.

As is seen from FIGS. 2 and 3, the rotary connecting member 5 is connected to the upper end 1c of the steering knuckle 1 and coaxially arranged on a king pin axis "$L_K$" which passes through both a center of the ball-joint 3 and a body connecting point "SP" at which an upper end of a piston rod 31b of an after-mentioned shock absorber 31 is connected to the vehicle body. Specifically, as is seen from FIG. 3, the rotary connecting member 5 comprises a stepped supporting shaft 5a which is mounted on the upper end 1c in a manner to be coaxial with the king pin axis "$L_K$", and a cylinder 5d which is rotatably supported by the supporting shaft 5a through upper and lower bearings 5b and 5c. The cylinder 5d is formed at an outside part thereof with a first cylindrical supporting portion 5e and at an inside part thereof with a second cylindrical supporting portion 5f.

Figure 4:
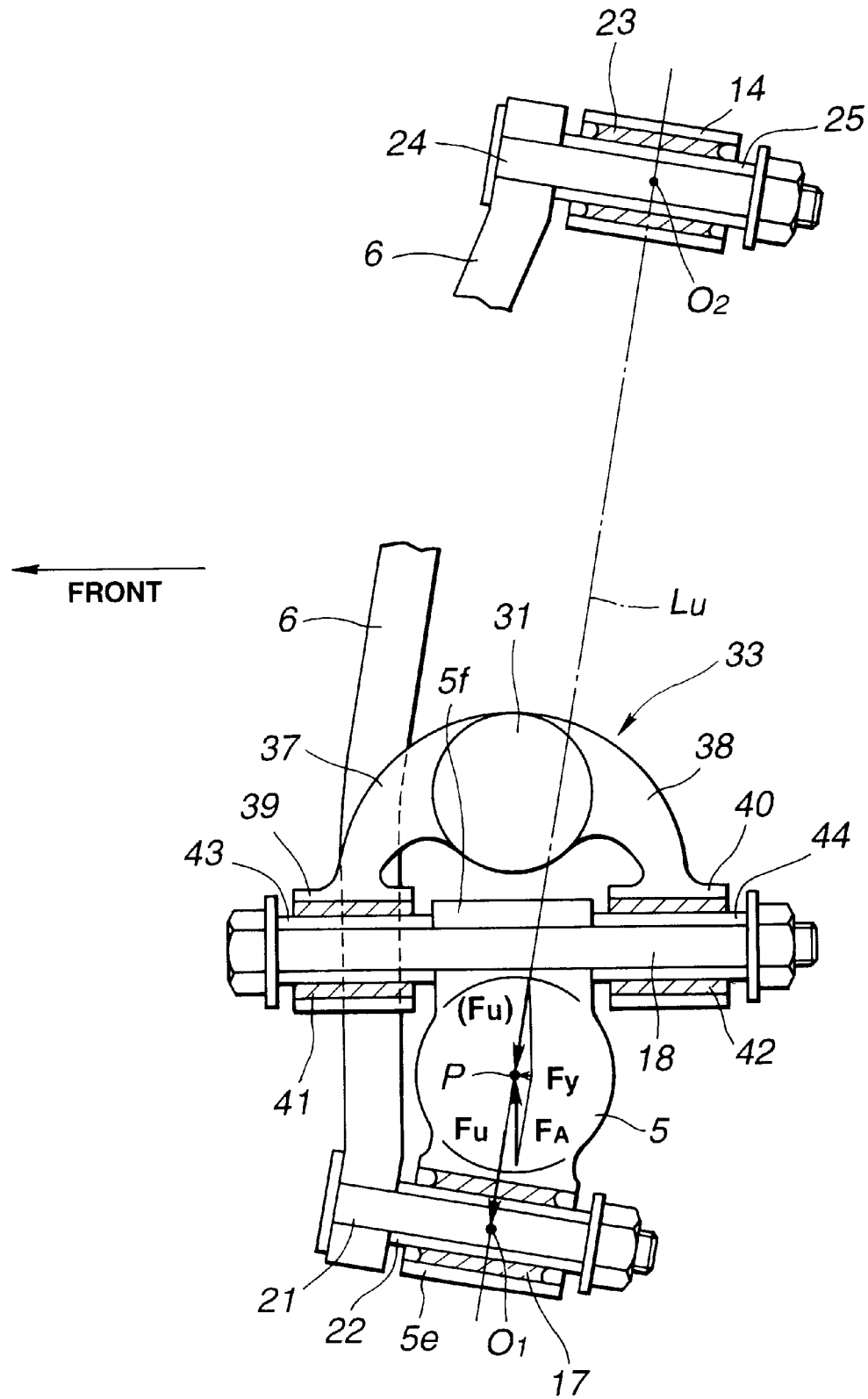
FIG. 4 is a plan view showing a positional relationship between essential parts employed in the front suspension.

As is seen from FIG. 4, the first cylindrical supporting portion 5e is so arranged and oriented that an axis thereof extends in a direction perpendicular to an after-mentioned link axis "$L_U$" of the upper link 6, and the second cylindrical supporting portion 5f is so arranged and oriented that an axis thereof extends in a longitudinal direction of the vehicle. These first and second cylindrical supporting portions 5e and 5f support the upper link 6 and the strut 7 respectively. As shown, the first cylindrical supporting portion 5e has a resilient bush 17 installed therein, and the second cylindrical supporting portion 5f has a rotary supporting shaft 18 rotatably held thereby with both ends exposed. The rotary supporting shaft 18 supports the strut 7.

As is seen from FIG. 1, the upper link 6 is in the form of character "I", which has an outside end connected to the rotary connecting member 5 and an inside end connected to an inside member of the vehicle body. That is, as is seen from FIG. 4, the outside end of the upper link 6 is provided with a rearwardly extending shaft 21 about which the resilient bush 17 of the rotary connecting member 5 is disposed through a cylindrical collar 22. While, the inside end of the upper link 6 is provided with a rearwardly extending shaft 24 about which a resilient bush 23 is disposed through a cylindrical collar 25. As is understood from FIG. 1, the resilient bush 23 is installed in the supporting portion 14 suspension member 10.

As is seen from FIGS. 1 and 4, the upper link 6 is arranged at a forwardly offset position with respect to the link axis "$L_U$". This means that the upper link 6 extends laterally in front of the rotation connecting member 5. As is seen from FIGS. 1 and 2, the upper link 6 extends below a cylindrical supporting portion 39 of an after-mentioned connecting bracket 33 for the strut 7, and as is best seen from FIG. 2, the upper link 6 extends below the side member 9. Furthermore, as is FIGS. 1 and 4, the upper link 6 is so angled with respect to the longitudinal axis of the vehicle so that the outside end of the upper link 6 is positioned forward with respect to the inside end of the same. As is seen from FIGS. 1 and 2, the outside end of the upper link 6 connected to the rotary connecting member 5 is neatly received in an inside portion of the wheel 2, which can increase the length of the upper link 6 by a satisfied degree.

As is seen from FIGS. 1 and 2, the strut 7 generally comprises a shock absorber 31 and a coil spring 32 disposed about the absorber 31. As is seen from FIGS. 1 and 2, the shock absorber 31 comprises a cylinder 31a which has at its lower end the connecting bracket 33 connected thereto, and a piston rod 31b which projects upward from the cylinder 31a and has an upper end connected to a portion of the vehicle body through a mount rubber 34 and a mount plate 35.

Figure 5:
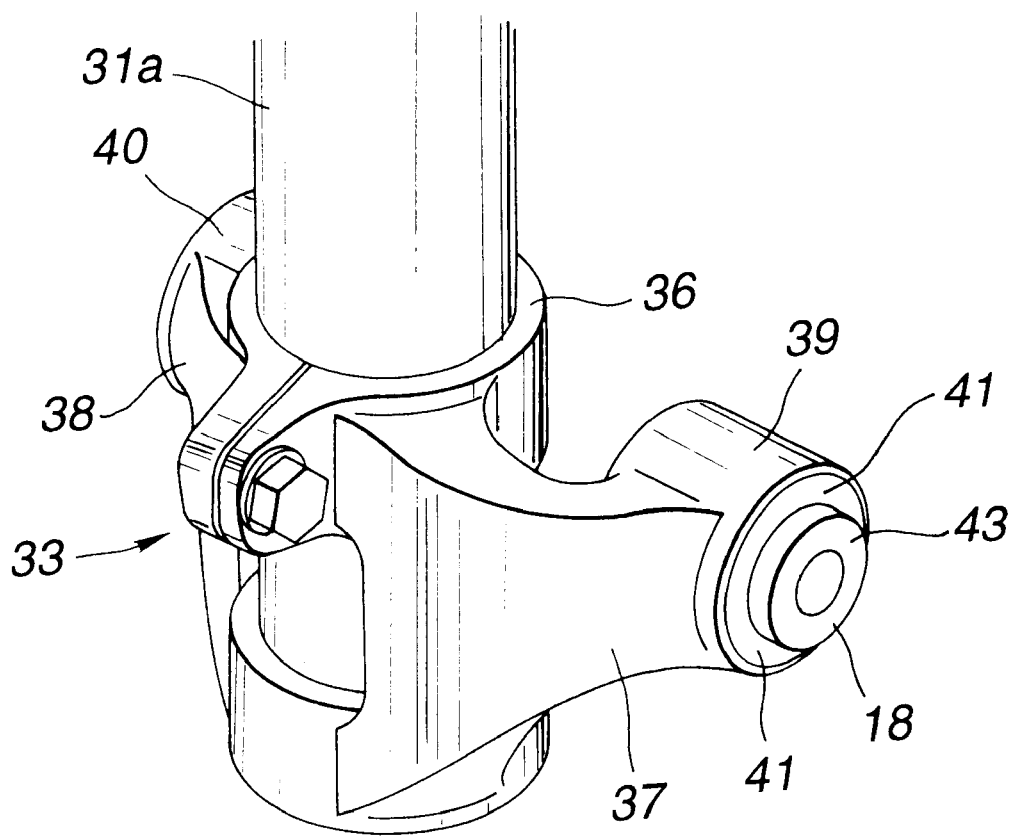
FIG. 5 is a perspective view of a connecting bracket for a shock absorber.

As is seen from FIG. 5, the connecting bracket 33 comprises a cylindrical base portion 36 which is bolted to the lower end of the cylinder 31a, two arm portions 37 and 38 which extend laterally outward from the base portion 36, cylindrical supporting portions 39 and 40 which are respectively defined by leading ends of the arm portions 37 and 38, resilient bushes 41 and 42 (see FIG. 4) respectively installed in the cylindrical supporting portions 39 and 40, and cylindrical collars 43 and 44 respectively installed in the resilient bushes 41 and 42.

As is seen from FIG. 4, the cylindrical supporting portions 39 and 40 are coaxially aligned having the second cylindrical supporting portion 5f of the rotary connecting member 5 coaxially interposed between the two supporting portions 39 and 40. The above-mentioned rotary supporting shaft 18 passes through the cylindrical collar 43, the bore of the second cylindrical supporting portion 5f and the other cylindrical collar 44. With this, as is seen from FIG. 2, the connecting bracket 33 can pivot relative to the rotary connecting member 5 about an axis of the rotary supporting shaft 18, that is, about a longitudinally extending axis of the vehicle.

As is seen from FIG. 2 which is taken from a front position of the vehicle, the front suspension of the invention has not only a construction of a double wishbone type including the lower and upper links 4 and 6 but also that of a strut type including the strut 7. This means that the front suspension of the invention possesses both the advantages of these two types of suspensions.

That is, as is easily seen from FIG. 2, movement of the front wheel 2 and the steering knuckle 1 caused by a wheel stroke is restricted by the lower and upper links 4 and 6 as viewed from the front thereof, like in case of the double wishbone type suspension, whereas the movement is restricted by the lower link 4 and the shock absorber 31 as viewed from the side thereof, like in case of the strut type suspension.

Likewise, as for a force inputted to the front wheel 2, a longitudinally inputted force (viz., longitudinal force) is received by the lower link 4 and the strut 7 like in case of the strut type suspension, whereas a laterally inputted force (viz., lateral force) is received by the lower and links 4 and 6 like in case of the double wishbone type suspension.

Thus, when, upon turning of the motor vehicle or the like, the front wheel 2 undergoes a lateral force operating from a road surface toward the inside of the vehicle body, the steering knuckle 1 also receives the lateral force. At that time, in the steering knuckle 1 at the lower portion thereof, its movement in the lateral direction is restricted by the lower link 4, so that the lateral force transmitted to the steering knuckle 1 is in turn transmitted to the rotary connecting member 5 arranged in the upper portion of the steering knuckle 1, producing a lateral force "$F_A$" which operates along the king pin axis "$L_K$" as shown in FIG. 4. Because the rotary supporting shaft 18 is oriented to extend substantially longitudinally, the strut 7 hardly produces a reaction force against the lateral force "$F_A$".

On the other hand, in the upper link 6, a marked reaction force "$F_U$" is induced against the lateral force "$F_A$" along the link axis "$L_U$" which, as is seen from FIG. 4, passes through both a rotation center "$O_1$" of the resilient bush 17 and that "$O_2$" of the resilient bush 23. That is, the resilient bush 17 is disposed on the shaft 21 fixed to the outside end of the upper link 6, and the resilient bush 23 is disposed on the shaft 24 fixed to the inside end of the upper link 6. It is to be noted that the upper link 6 is in the form of an I-shaped link which is mounted to the vehicle body side member and the rotary connecting member 5 at one point thereof, respectively, and as is seen from FIG. 2, the link axis "$L_U$" intersects the king pin axis "$L_K$" at an intersection point "CP". Therefore, in addition to a small force due to torsion, etc., of the resilient bushes 17 and 23, only an axial force of compression or extension is applied along the link axis "$L_U$", producing substantially no angular moment for rotating the rotary connecting member 5 about the kin pin axis "$L_K$". And, only a longitudinal force "$F_Y$" produced due to inclination of the link axis "$L_U$" with respect to the lateral direction of the vehicle operates on the rotary connecting member 5. In the same way as a longitudinally inputted force operating to the front wheel 2, the longitudinal force "$F_Y$" is received by the strut 7 which is supported by the rotary connecting member 5 to pivot about the longitudinal axis of the vehicle. As a result, even if the upper link 6 and the rotary connecting member 5 are connected to each other at one point, any lowering of the camber rigidity and the lateral rigidity is not induced.

Conventionally, an angular moment for rotating the rotary connecting member is produced by an axial force of the upper link and a force inputted from the mounting portion of the steering knuckle to the rotary connecting member. For supporting this angular moment, in the conventional technique, it is needed to connect the upper link to the rotary connecting member in a manner to allow pivoting of the upper link only about the longitudinal axis of the vehicle, that is, it is needed to connect the upper link and the rotary connecting member by two points.

Figure 6:
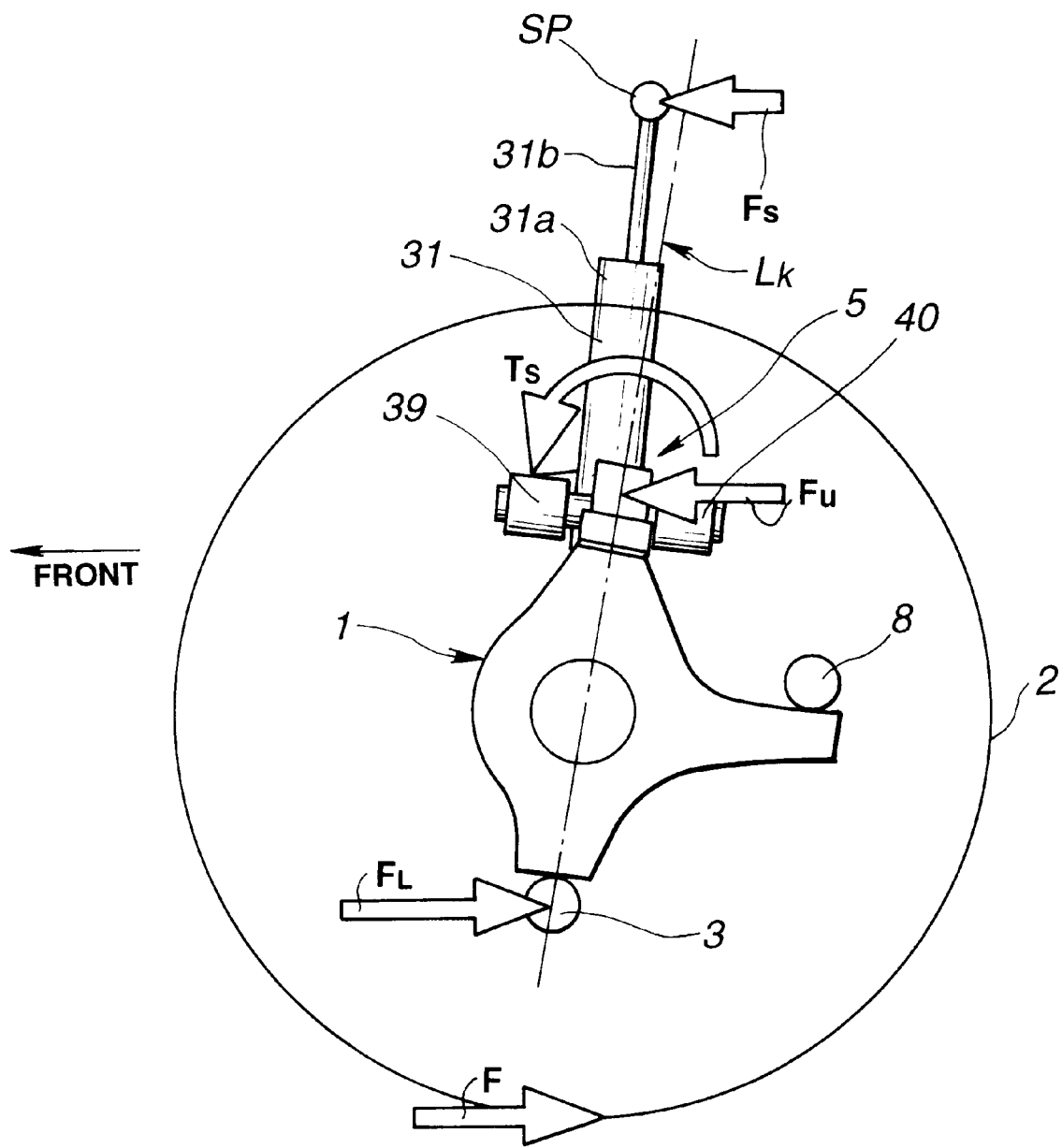
FIG. 6 is a schematic side view of the front suspension, depicting various actions which take place when an external force is applied thereto from a road surface in a front direction.

While, as is seen from FIGS. 2 and 6, in the present invention, when the front wheel 2 has a certain longitudinal force inputted thereto from the road surface due to braking of the vehicle, engine braking (in case of front drive vehicle), a rough surface of the road, etc., the steering knuckle 1 transmits the longitudinal force to the lower link 4 via the ball-joint 3 and to the rotary connecting member 5.

In this case, due to connection of the lower link 4 to the vehicle body at two points which are spaced in the longitudinal direction, the lower link 4 produces a reaction force "$F_L$" against the longitudinal force.

The rotary connecting member 5 has both the upper link 6 and the shock absorber 31 connected thereto. Since the upper link 6 has both the laterally outer end connected to the rotary connecting member 5 through the resilient bush 17 and the laterally inner end connected to the suspension member 10 through the resilient bush 23, the upper link 6 produces only a small reaction force by the resilient bushes 17 and 23 against the longitudinal force "$F_U$" inputted to the rotary connecting member 5 from the steering knuckle 1. Specifically, the small reaction force is produced when the resilient bushes 17 and 23 are twisted.

As is seen from FIG. 4, the shock absorber 31 is connected to the rotary connecting member 5 in a manner to pivot about the axis of the longitudinally extending shaft 18. Thus, the rotary connecting member 5 transmits the longitudinal force "$F_U$" inputted thereto from the steering knuckle 1 to the shock absorber 31 as a corresponding torque "$T_S$", as shown.

The shock absorber 31 and the rotary connecting member 5 can pivot about the axis of the stepped supporting shaft 5a of the rotary connecting member 5, that is, about the king pin axis "$L_K$". Thus, the input force "$F_U$" from the rotary connecting member 5 is applied in the longitudinal direction of the vehicle against the axis "$L_K$".

As is understood from FIG. 2, the king pin axis "$L_K$" passes through the connecting point "SP" between the shock absorber 31 and the vehicle body as viewed from the front of the vehicle. Thus, the input force "$F_U$" from the rotary connecting member 5 is applied through the shock absorber 31 to the connecting point "SP" as a longitudinal force "$F_S$" without producing angular moment.

Accordingly, the upper portion of the steering knuckle 1 is supported by the reaction force "$F_S$" which is produced when the shock absorber 31 and the mount rubber 34 are loaded. Thus, any lowering of the camber rigidity, which tends to occur when the rotary connecting member 5 and the shock absorber 31 rotate, is not induced.

Figure 7:
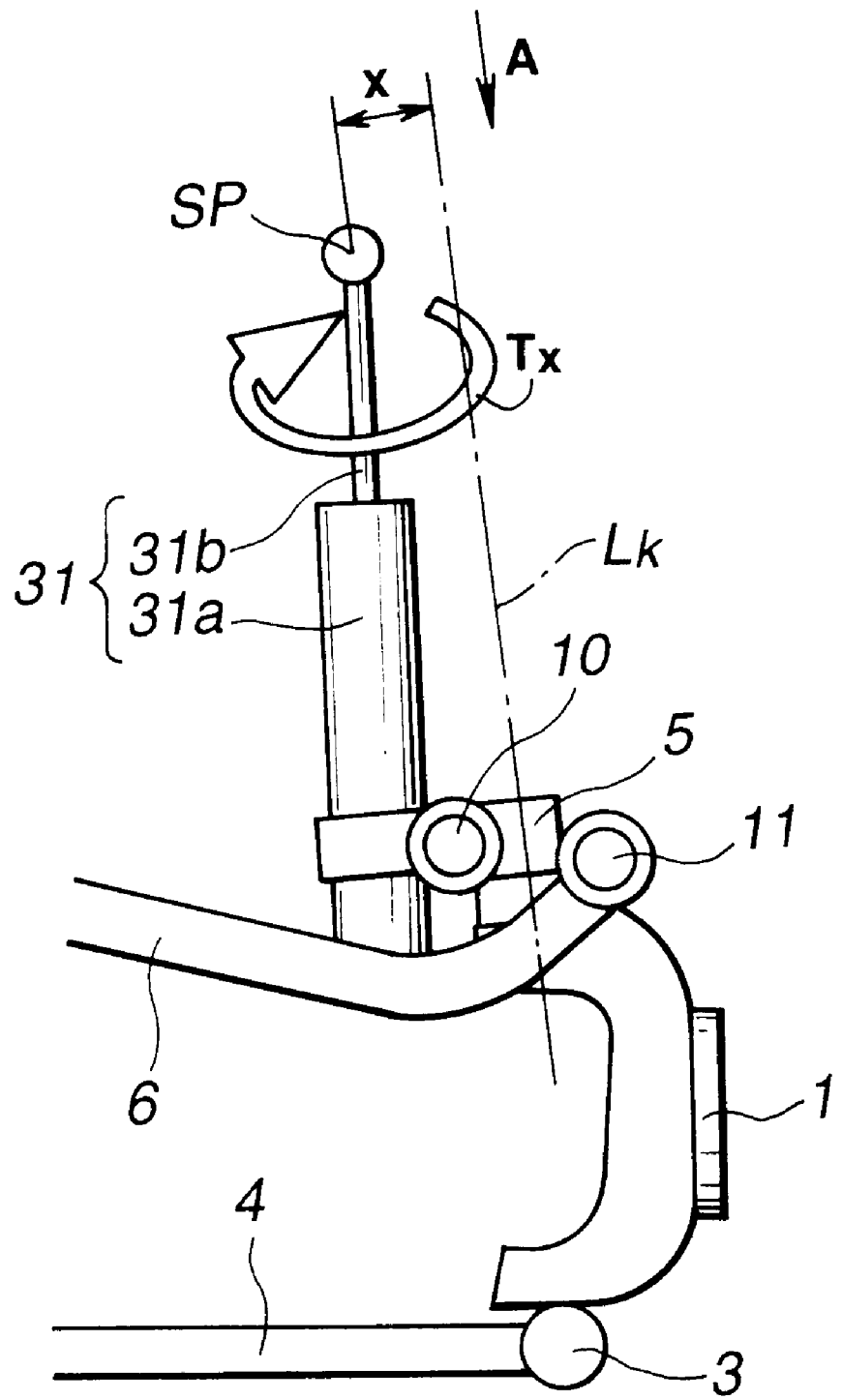
FIG. 7 is a schematic front view of the front suspension showing a case wherein a rotation axis of the rotary connecting member fails to pass through a portion where a shock absorber is connected to the vehicle body.
Figure 8:
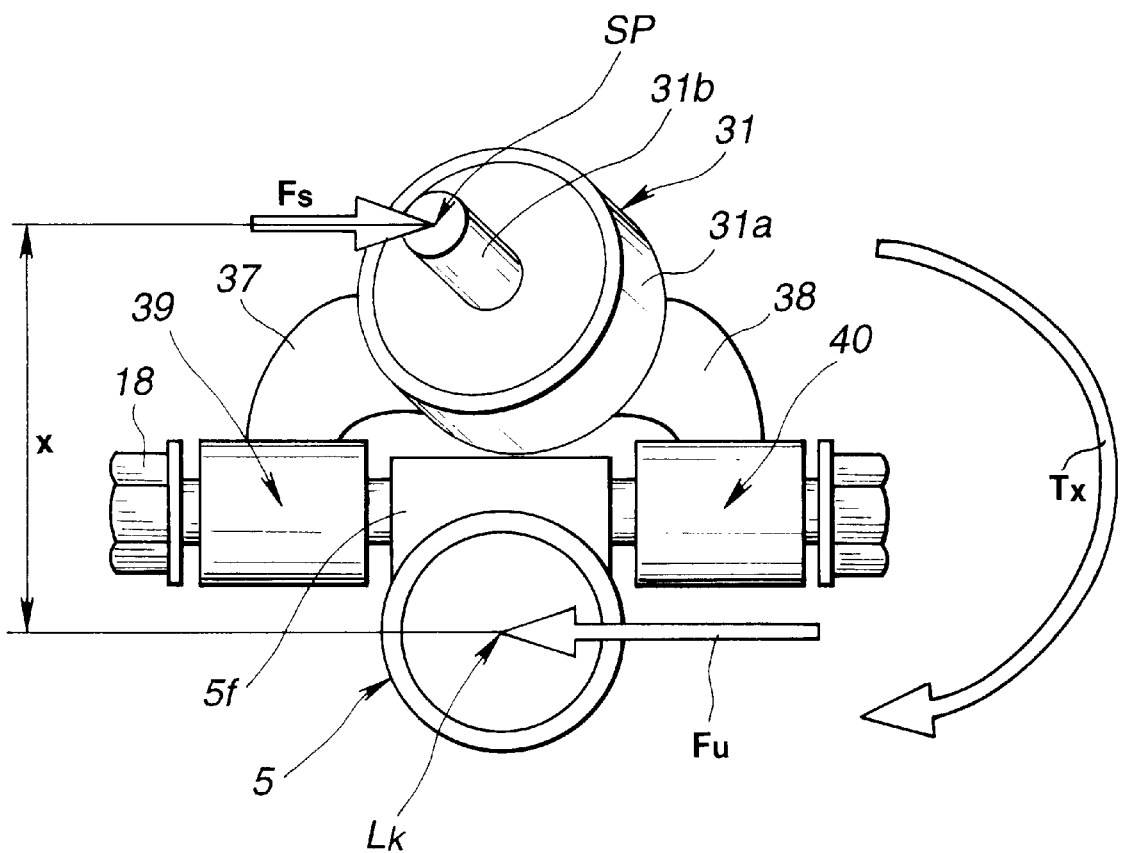
FIG. 8 is a plan view of the front suspension of FIG. 7, which is taken along the rotation axis of the rotary connecting member.

In order to much clarify the advantageous operation of the front suspension of the invention, an arrangement wherein the rotation axis "$L_K$" of the rotary connecting member 5 does not pass through the connecting point "SP" as viewed from the front of the vehicle will be described with reference to FIGS. 7 and 8.

That is, in such arrangement, the longitudinal force "$F_U$" (see FIG. 8) inputted to the rotary connecting member 5 causes generation of a certain torque "$T_X$" to rotate both the rotary connecting member 5 and the shock absorber 31 about a standing axis passing through the point "SP", the torque "$T_X$" being determined in accordance with offset amount "x" between the connecting point "SP" and the rotation axis "$L_K$" of the rotary connecting member 5 as viewed from the front of the vehicle. Due to generation of such torque "$T_X$", both the rotary connecting member 5 and the shock absorber 31 are forced to rotate about the standing axis thereby moving the upper portion of the steering knuckle 1, resulting that the camber rigidity is lowered. While, in the invention, there is produced substantially no torque corresponding to the torque "$T_X$".

As is described hereinabove, in the present invention, the rotation axis "$L_K$" passes through the body connecting point "SP" of the shock absorber 31 as viewed from the front of the vehicle. Thus, any lowering of the camber rigidity, which tends to occur when a longitudinal force is inputted to the front wheel 2, is not induced. Thus, the upper link 6 and the rotary connecting member 5 can be connected at one point without lowering the driving stability of the vehicle, together with a possible reduction in weight and cost of the front suspension.

Further, since the upper link 6 is connected at its laterally outer end to the laterally outer supporting portion 5e of the rotary connecting member 5, the length of the upper link 6 can be increased, resulting in improved durability of the resilient bushes 17 and 23 and the linearity of camber changing phenomenon.

Further, since the supporting portion 5e (see FIG. 4) by which the upper link 6 is connected to the rotary connecting member 5 is arranged to extend perpendicular to the link axis "$L_U$", deformation of the resilient bush 17 is reduced or minimized and thus the camber rigidity and the lateral rigidity can be appropriately balanced.

When, due to bounding/rebounding, the front wheel 2 is applied with a force and thus the steering knuckle 1 is applied with a vertical force, a reaction force out of the strut 7 acts to maintain a force balance so long as the upper link 6 does not interfere with the side member 9. At that time, as for a torque produced due to offset of the king pin axis "$L_K$" with respect to the strut 7, a force balance is maintained due to the fact that the rotary connecting member 5 and the steering knuckle 1 are connected to each other about the substantially vertical supporting shaft 5a. While, as for a small torque for rotating the rotary connecting member 5 about the king pin axis "$L_K$", a force balance is maintained by the reaction force at the upper link 6 as described hereinabove.

The rotary connecting member 5 is so arranged that the rotation axis "$L_K$" thereof passes through the ball-joint 3 by which the lower link 4 and the steering knuckle 1 are connected. This means that the rotation axis "$L_K$" is coincident with the king pin axis "$L_K$" which passes through both the center of the ball-joint 3 and the body connecting point "SP" of the shock absorber 31. Thus, upon turning of the front wheel 2, the steering knuckle 1 is permitted to make smooth turning about the axis "$L_K$" inducing a certain displacement of the lower link 4, the upper link 6 and the strut 7. Thus, resilient bushes incorporated with these parts 4, 6 and 7 are prevented from suffering needless deformation.

In the above-mentioned embodiment, the rotation axis "$L_K$" of the rotary connecting member 5 intersects the link axis "$L_U$" of the upper link 6 at the intersection point "CP" and passes through the body connecting point "SP" of the shock absorber 31. However, the present invention is not limited to this arrangement. That is, even if the intersection point "CP" is slightly displaced due to manufacturing tolerance or the like thereby failing to produce a real intersection point between the two axes "$L_U$" and "$L_K$", or even if the rotation axis "$L_K$" is slightly displaced from the body connecting point "SP" of the shock absorber 31 for example by about 30 mm to 40 mm (which is determined with respect to the rigidity of the bushes and the steering knuckle 1), the provision of the resilient bush 17 between the upper link 6 and the rotary connecting member 5 can effectively absorb a moment inevitably produced due to the displacement. That is, such moment is absorbed by pinching resiliency of the bush 17, so that substantially same effects as that of the above-mentioned first embodiment are obtained. Since the resilient bush 17 is arranged to extend perpendicular to the link axis "$L_U$" of the upper link 6, deformation of the bush 17 produced upon application of an axial tension to the upper link 6 can be minimized and thus the camber rigidity and the lateral rigidity can be appropriately balanced. Of course, this advantageous effect is achieved even if the right angle intersection is not strictly made between the bush 17 and the link axis "$L_U$".

In the above-mentioned embodiment, the rotation axis "$L_K$" of the rotary connecting member 5 passes through the center of the ball-joint 3 by which the lower link 4 and the steering knuckle 1 are connected. However, the present invention is not limited to this arrangement. That is, the rotation axis "$L_K$" may be slightly displaced from the center of the ball-joint 3.

In the above-mentioned embodiment, the upper link 6 is arranged to extend below the supporting portion 39 for the strut 7. However, if desired, the upper link 6 may extend above the supporting portion 39.

In the above-mentioned embodiment, the upper link 6 is arranged at a forwardly offset position with respect to the link axis "$L_U$". However, if desired, the upper link 6 may be arranged at a rearward offset position with respect to the link axis "$L_U$".

In the above-mentioned embodiment, the connection of the upper link 6 to both the rotary connecting member 5 and the suspension member 10 is made by the resilient bushes 17 and 23. However, if desired, ball-joints may be used in place of the resilient bushes 17 and 23. In that case, a center of a ball of the ball-joint forms an immobile center of motion, and a line interconnecting the immobile centers of motion of the ball-joints respectively connected to inner and outer ends of the upper link 6 forms the link axis "$L_U$".

Figure 9:
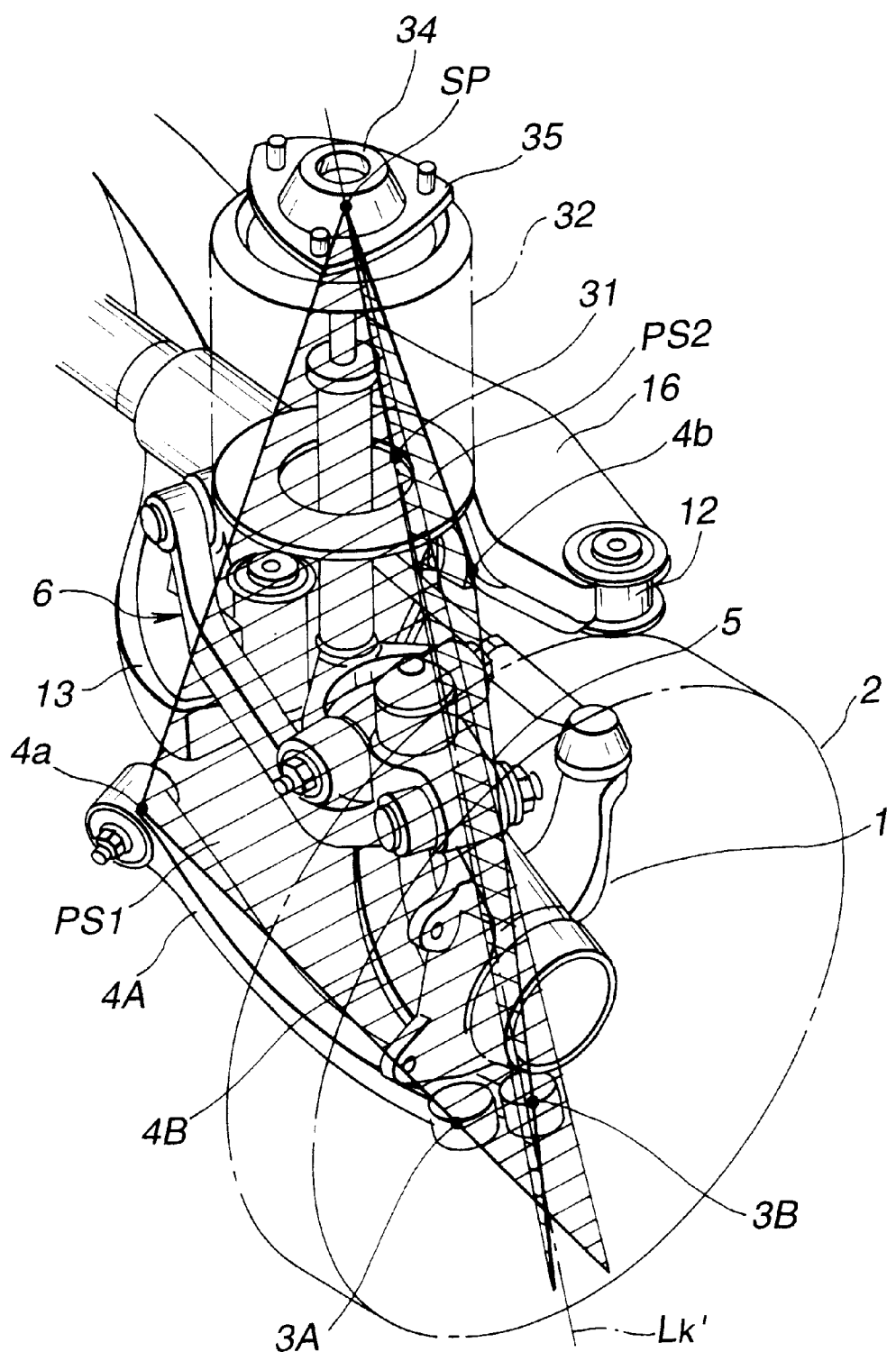
FIG. 9 is a perspective view of a front suspension which is a second embodiment of the present invention, wherein two lower links are employed.

In the above-mentioned embodiment, the lower link 4 is a single member shaped like character "A" when viewed from above. Alternatively, if desired, as is shown in FIG. 9, the lower link 4 may comprise two I-shaped lower link parts, each having an outer end connected to the lower portion of the steering knuckle 1 through a ball-joint 3A or 3B and the other end supported to the vehicle body side member at a point 4a or 4b. In that case, an intersection line between a first imaginary plane PS1 which contains the point 4a, a center of the ball-joint 3A and the body connecting point "SP" and a second imaginary plane PS2 which contains the point 4b, a center of the ball-joint 3B and the body connecting point "SP" forms a virtual king pin axis "$L_K$" which does not pass through the ball-joints 3A and 3B. That is, in spite of interference with the other parts such as a brake rotor, the king pin axis "$L_K$" can be set in the most suitable position.

What is claimed is:

1. A wheel suspension for a front wheel of a motor vehicle including a vehicle body, comprising:

a supporting member rotatably supporting the front wheel, said supporting member having an upper portion and a lower portion;

a lower link having an outer end pivotally supporting said lower portion and an inner end swingably supported by the vehicle body;

a connecting member mounted to said upper portion and rotatable about a first axis relative to said upper portion;

a shock absorber having an upper end pivotally connected to the vehicle body at a first point and a lower portion connected to said connecting member;

an upper link pivotally connected to said connecting member at a second point and pivotally connected to the vehicle body at a third point; and a tie rod connected to said supporting member to rotate the same about said first axis, wherein said first axis intersects a second axis passing through said second and third points and passes through a limited area containing said first point.

2. A wheel suspension as claimed in claim 1, in which said upper link and said connecting member are connected through a resilient bush.

3. A wheel suspension as claimed in claim 2, in which said upper link and said vehicle body are connected through a resilient bush.

4. A wheel suspension as claimed in claim 3, in which at least one of said resilient bushes of said upper link is so arranged that an axis thereof is perpendicular to said second axis.

5. A wheel suspension as claimed in claim 1, in which said first axis passes through a limited area containing a connecting point where the outer end of said lower link is pivotally connected to the lower portion of said supporting member.

6. A wheel suspension as claimed in claim 1, in which said second point is positioned laterally outside with respect to said first axis.

7. A wheel suspension as claimed in claim 1, in which said lower link comprises two lower link parts, each having an outer end pivotally connected to said lower portion of the supporting member and an inner end pivotally connected to said vehicle body.

* * * * *